United States Patent
Fan et al.

(10) Patent No.: US 12,462,710 B2
(45) Date of Patent: Nov. 4, 2025

(54) SWEATING SIMULATOR

(71) Applicant: THE HONG KONG POLYTECHNIC UNIVERSITY, Hong Kong (CN)

(72) Inventors: Jintu Fan, Hong Kong (CN); Amir Shahzad, Hong Kong (CN)

(73) Assignee: The Hong Kong Polytechnic University, Hong Kong (CN)

( * ) Notice: Subject to any disclaimer, the term of this patent is extended or adjusted under 35 U.S.C. 154(b) by 548 days.

(21) Appl. No.: 18/160,580

(22) Filed: Jan. 27, 2023

(65) Prior Publication Data

US 2023/0245594 A1      Aug. 3, 2023

(51) Int. Cl.
| | |
|---|---|
| *G09B 23/00* | (2006.01) |
| *B01L 3/00* | (2006.01) |
| *G01G 17/04* | (2006.01) |
| *G01N 11/04* | (2006.01) |
| *G05D 7/06* | (2006.01) |
| *G05D 23/19* | (2006.01) |
| *G05D 27/02* | (2006.01) |

(Continued)

(52) U.S. Cl.
CPC ...... *G09B 23/303* (2013.01); *B01L 3/502715* (2013.01); *G01G 17/04* (2013.01); *G01N 11/04* (2013.01); *G05D 7/067* (2013.01); *G05D 23/1917* (2013.01); *G05D 27/02* (2013.01); *G01N 33/367* (2013.01)

(58) Field of Classification Search
CPC ............................ G09B 23/303; G01N 11/04
See application file for complete search history.

(56) References Cited

U.S. PATENT DOCUMENTS

| | | | | |
|---|---|---|---|---|
| 2002/0191669 A1* | 12/2002 | Fan | ......................... | G01N 25/18 374/45 |
| 2007/0151374 A1* | 7/2007 | Polegato Moretti | ... | G01N 15/08 73/865.6 |

FOREIGN PATENT DOCUMENTS

CN      113267528 A    *    8/2021       ............. G01N 25/20

OTHER PUBLICATIONS

Kam-Hong Chau, Ka-Po Maggie Tang, and Chi-Wai Kan, "Constant Temperature Drying Rate Tester: Real-Time. Water Evaporation Measurement of Fabrics" IEEE Transactions on Instrumentation and Measurement, vol. 67, No. 11, pp. 2635-2648, 2018.

* cited by examiner

*Primary Examiner* — Jamel E Williams
(74) *Attorney, Agent, or Firm* — S&F/WEHRW

(57) ABSTRACT

A sweating simulator has a foundation panel (14), a panel (1) and a temperature control panel (2), a fixture for fixing a specimen, a container (7) for holding simulated sweat, a container (15) for collecting the simulated sweat, and a plurality of weighing scales for measuring masses of the simulated sweat supplied, evaporated and dripped from the specimen, respectively. The panel (1) and temperature control panel (2) constitute a simulated sweating plane for simulating wetting properties and temperature of skin. An upper middle position of the temperature control panel (2) has a sweating zone (3), which has a plurality of sweating pores (4). The temperature control panel (2) has a temperature sensor (8) and a heating element to control the temperature of the temperature control panel (2) around 33-35° C. to simulate the temperature of the human skin surface. The sweating rate of the sweating zone (3) is in the range of about 1 to 624 ml/h or about 0.004 to 2.5 L/h-m² to simulate various sweating intensities.

20 Claims, 4 Drawing Sheets

(51) Int. Cl.
*G09B 23/30* (2006.01)
*G01N 33/36* (2006.01)

SWEATING SIMULATOR

CROSS-REFERENCE TO RELATED APPLICATIONS

This application claims priority to China Patent Application No. 202210109569.6 filed on Jan. 28, 2022, the disclosure of which is hereby incorporated by reference in its entirety.

FIELD OF THE DISCLOSURE

The present invention relates to a sweating simulator.

BACKGROUND OF THE DISCLOSURE

In the design of fabrics or fabric layers used, for example, in diapers, the manner in which moisture is absorbed, distributed and evaporated from the fabric is altered by changing the material and/or construction. For various fabric applications such as in rainwear, sportswear, medical dressings, and incontinence pads, different properties or characteristics or combinations of properties are required. Generally, the applicable properties and characteristics are known from practice or provided empirically. To evaluate the liquid and moisture management properties of clothing fabrics in terms of sweat absorption, evaporation, draining and drying, it is necessary to be equipped with a test auxiliary device that can simulate human sweating. This device is referred to as a sweating simulator.

In the art, the most commonly used standard test methods for measuring wettability, liquid moisture management, absorbency, vertical wicking and horizontal wicking of fabrics may be provided by the following technical standards: BS 4554:1970, AATCC 195-2017, AATCC 79-2014, AATCC 197-2018 and AATCC 198-2018; while for the determination of the drying rate of fabrics, the most commonly used standard test methods may be found from the following technical standards: AATCC 200, where the airflow method is used to measure the drying rate of fabrics under their absorbent capacity; AATCC 201, where the heated plate method is used to measure the drying rate of fabrics; ISO13029, where a modified sweat protection hot plate is used to measure the drying of fabrics under dynamic conditions; and AATCC 199, where the moisture analyzer method is used to measure the drying rate.

Another constant temperature drying rate tester (CTDRT) is disclosed in "Constant Temperature Drying Rate Tester: Real-Time Water Evaporation Measurement of Fabrics" by Chau (see *IEEE Transactions on Instrumentation and Measurement*, Vol. 67, No. 11, pp. 2635-2648, 2018) to determine the drying rate of fabrics at a constant skin temperature. The tester measures real-time evaporation by recording a weight loss of 0.2 mg of water applied by an automatic pipette to the top surface of the test specimen. While the tester simulates skin temperature and can differentiate the drying rates of various fabrics based on their liquid spreading behavior, moisture content and wetting mechanisms are unable to simulate real sweating and wearing conditions.

U.S. Pat. No. 6,499,338 B2 discloses a Moisture Management Tester (MMT), which is the most widely used transverse wicking test, in which the moisture absorption, diffusion and transport behavior of fabrics are measured by recording the change in electrical resistance of the fabric. However, the device has certain limitations in simulating profuse sweating due to the single outlet and limited content of liquid applied. Besides, during testing of fabrics with irregular surfaces and mesh type construction (widely used in lining and sportswear applications), all the sensing electrodes may not come in similar contact with the fabric's surface, which may affect the accuracy of the results. Despite all, the MMT lacks in measuring the true liquid content between two planes of the fabric, since it can only detect the presence of surface water content. This is why the use of MMT is limited to the plane surface and uniformly or continuously treated hydrophilic fabrics.

A Transplane Water Transport Tester (TWTT) provides a better solution to study the transplane liquid absorption and surface evaporation of a fabric. During testing on TWTT, water is maintained at a constant height level underneath the test specimen at a controlled temperature, whereby the initial absorption and surface evaporation over time is measured from the specimen. Even though the instrument is novel in simulating various end-user applications, it cannot emulate real-time wearing posture and regional sweating over the skin.

In another development, an artificial microfluidic device replicating human perspiration with microporous skin texture was introduced to expedite the research and development of skin wearable materials, products, and devices. The artificial microfluidic device is consisting of a microporous polycarbonate membrane and a gravity feed flow system to provide a sweating rate of about $0.75\ Lh^{-1}\ m^{-2}$. However, due to the small size and whole surface sweating, the artificial microfluidic device may not be able to evaluate the moisture management related properties of clothing fabric.

Besides, perspiring thermal manikins provided the best simulation of the human body wearing clothing system. However, most of the thermal manikins are designed to assess the water vapors and heat transfer properties of the clothing. There are also some available liquid sweating thermal manikins, however, they cannot accurately measure the rate of evaporation and sweating dripping in real time.

U.S. Pat. No. 6,543,657 B2 revealed a perspiring thermal manikin employing a permeable cloth filled with water. Although the manikin is good at accuracy and reproducibility of results, it does not simulate liquid sweating.

The sweating torso, in the form of a sweating cylinder, is another instrument to evaluate the dry and wet heat and moisture transfer properties of fabrics, among the perspiring thermal manikins. However, the system does not account for the realistic silhouette and regional sweating intensities of the human sweating torso where certain regions like the upper back and middle regions sweat more than their surroundings. However, in the so-called sweating torso, the sweating nozzles are roughly distributed on the whole cylinder. Thus, the spatial and temporal migration of sweat from the skin to clothing cannot be evaluated over time.

In general, the standard test methods and apparatuses for fabric liquid management performance testing commonly used in the art have the following deficiencies:

a. The horizontal wicking test according to AATCC 198 is performed by using a small amount of liquid on fabrics arranged horizontally. These conditions do not truly simulate the real-time wearing and wetting conditions of fabrics in contact with sweating skin. Furthermore, in real human sweating situations, the vertical orientation of fabric aligned with a sweating skin is the widely observed scenario. Due to such differences, the evaluation of liquid moisture management and the performance properties of clothing fabrics, are beyond the scope of the horizontal wicking test method.

b. Vertical wicking test according to AATCC 197 is performed starting with a rectangular strip of fabric.

The bottom end of the strip is dipped in an indefinite reservoir of water and the antigravity capillary rise of water is measured over time. Again, the test method is far away from the fabrics actual sweat absorbing and spreading experience during wearing. This is why the results obtained by this test method are not recommended for assessing the comfort properties of clothing.

c. Usually, the use of a MMT according to AATCC 195 is widely reported in the evaluation of liquid moisture management properties of clothing fabrics. However, the test is limited only to the horizontally aligned flat and smooth surface fabrics. The method is not recommended for coated, laminated, thick, high absorbent and complex fabric constructions. Moreover, measuring liquid moisture transport in the flat state of fabric with a few drops of solution according to this method does not simulate profuse sweating and actual wearing conditions. Another disadvantage of MMT consists in its inability to determine the real in-plane spreading direction of liquid moisture. Besides, the measurements produced are not indicative of performance specifications of fabrics in exposure to human sweating, where the sweat absorption, spreading, directional wicking, gravitational migration, evaporation, dripping and drying may come all together.

d. Applications of Sweating Manikins and Sweating Torso: the sweating manikins are the advanced techniques of liquid sweat management properties of clothing ensembles in their ready to wear form. Generally, the manikins and sweating torso are used to measure the clothing thermal resistance, evaporative resistance, and evaporative cooling potential under steady-state thermal conditions. The measurements are made indirectly by measuring the power input to keep the set temperature constant during testing. However, the manikins that are heavy, costly and complex in operation are not widely used for developing and evaluating moisture management garments. On the other hand, it is still difficult to obtain the most accurate and reproducible measurements with the sweating thermal manikins. Even though the Walter manikin is accurate, it does not simulate droplet sweating process. Moreover, due to unparallel distribution of air flow along sides, front and back of conventional sweating manikin and cylindrical sweating torso, the liquid evaporation of fabrics under forced convection cannot be studied precisely and with high repeatability.

Furthermore, the research of the spatial and temporal distribution of sweat on fabrics has received little attention due to the unavailability of a technique that could simulates the regional sweating rates of the human sweating torso in the prior art. However, on a human sweating torso, the study of sweat migration from high intensity sweating zones to its surroundings can reveal meaningful information about the dynamics of liquid sweat spreading and evaporation. The information obtained can be employed in the construction and design of next-generation evaporative cooling garments where the specially designed fibrovascular networks can be embedded into the fabrics causing rapid sweat transmission, evaporation, and collection to avoid dripping so as to boost the evaporation, comfort and quick-drying ability.

SUMMARY OF THE DISCLOSURE

The present invention relates to a device for simulating liquid perspiration in the high-intensity sweating zone of the human body and for real-time measurement of the sweat permeation, distribution, transmission, evaporation, accumulation, dripping, drying and other fabric wettability characteristics under different environmental conditions.

Therefore, the present invention provides a sweating simulator, including: a foundation panel, a panel mounted on the foundation panel, a temperature control panel supported by the panel, a fixture for fixing a specimen at the temperature control panel, a container for holding simulated sweat, a container for collecting the simulated sweat, and a plurality of weighing scales for measuring masses of the simulated sweat supplied, evaporated and dripped from the specimen, respectively, the container for collecting the simulated sweat is positioned under a bottom edge of the temperature control panel, the panel and the temperature control panel constitute a simulated sweating plane for simulating wetting properties and temperature of skin, an upper middle position of the temperature control panel includes a sweating zone, the sweating zone comprises a plurality of sweating pores, and the temperature control panel includes a temperature sensor and a heating element to control a temperature of the temperature control panel around 33-35° C., for example, so as to simulate a temperature of a surface of the human skin. Preferably, a sweating rate of the sweating zone is in the range of about 1 ml/h to 624 ml/h or about 0.004 L/h-m² to 2.5 L/h-m² to simulate various sweating intensities respectively.

The present inventors have designed and manufactured a sweating simulator device from scratch, from the initial conception to the realization of the technical solution of the present invention. The present inventors have spent a considerable amount of time in establishing a sweat pattern simulation with an adequate sweat pore distribution for an accurate and repeatable sweat control system. In addition, the present invention adds functions such as slope adjustment of the sweating plane, achieves precise control of sweating skin and sweating temperature, discovers a systematic specimen installation technology, controls its pretension, and can also be employed for measurement of the relative distribution of liquid content between two planes of a fabric, having significant wettability gradient on face and back.

The present invention proposes the measurement of liquid directional transport and the relative distribution of liquid content between two planes of the fabric by a simple gravimetric method, and is an innovative solution capable of measuring liquid distribution between adjacent facing layers of a double or triple layer fabric construction. The invention provides a novel measurement principle, which simulates the weighing of the whole body on a weighing balance, and simultaneously measures the real-time variations of sweating, evaporation and sweat dripping and fabric drying in simulated sweating and drying phases.

In accordance with the present invention, the principle of regional sweating simulating the profuse sweating zones of the torso is applied to the evaluation of spatial and temporal distribution and liquid sweat management properties of fabrics, and the unique distribution pattern of sweating pores replicates the sweat spreading on the back panel of a shirt when in contact with the sweating back upper middle portion.

In accordance with the present invention, the novel design and facile approach of constructing the novel sweating simulator using metal profiles and rectangular panels is provided. In accordance with the present invention, the application scheme of a skin simulating panel with an integrated heating element, temperature sensors, sweat pores, and skin like interface, i.e. having identical color, wetting properties, and skin temperature to test liquid management properties of the specimen, is provided. The present invention offers the novel functionality of slope adjustment of sweating head to simulate an active posture or an end-user application.

The systematic technique for specimen preparation and mounting of the present invention includes fixed and movable clamps for fixing the specimen in place, and a precision mechanism for pretension adjustment of the specimen under testing.

All possible changes and modifications within the scope of the claims of the present invention should be included in the present invention. For example, in one embodiment, the testing head may consist only of a torso front and back with localized high intensity sweating zones on the chest and back. In another embodiment, the torso manikin may also include a scalp/head with localized sweating zones on the forehead, sides or back of the head region, respectively. In other embodiments of the invention, if the sweating head is covered with a breathable fabric skin (which could be a fast absorbing and wicking fabric) with a hydrophilic inner liner, the device of the invention can be used to measure the vapor permeability of the garment fabrics at skin temperature.

In another embodiment, the breathable simulated skin according to the present invention may also include openings for some of the localized sweat pores, so that sweat vapor passes through the permeable simulated skin and liquid sweat excretes through the exposed sweat pores are combined in one plane. This potential unification of vapor sweating and liquid sweating in one plane of the present invention is a breakthrough aspect of the present invention in simulating the sweating properties of the natural torso, where insensitive sweating (vapor sweating) and sensitive sweating (liquid sweating) may occur at the same time.

The sweating simulator can determine the longevity of moisture management finishes, which are commonly applied to enhance moisture management properties of synthetic textiles, by the repeated testing of a specimen on the sweating simulator of the present invention. A pretty realistic and factual measurement is carried out on the liquid moisture management of the fabrics, especially quite close to actual wearing conditions.

In accordance with the present invention, a single sweating simulator can provide comprehensive information on the liquid moisture management properties of fabrics, where the sweat absorption, transmission and spreading on fabrics can be observed physically. In addition, the dynamic measurement of sweat production, accumulation, evaporation, dripping and drying can be assessed concurrently.

The sweating simulator of the present invention can provide a wide range of sweating rates 1 ml/h to 624 ml/h (0.004 L/h-m$^2$ to 2.5 L/h-m$^2$) to replicate a wide range of sweating intensities from profuse sweating zones of children, adults, and elderly people under certain activity or atmospheric conditions. The sweating simulator of the present invention can simulate various kinds of sweating behaviors, like continuous sweating, discrete sweating, constant sweating rate or increasing or decreasing sweating rates over a given interval of time.

The present invention can provide a novel testing principle of simulating a clothed human subject in full-body weight and directly measuring the real-time evaporative mass loss. The liquid sweat management properties of the fabrics are evaluated on the sweat plane, which provides skin-like properties, namely wetting behavior, temperature and liquid perspiration.

The unique design with flat-panel sweating head or a clip-on 3D torso sweating head mimics the chest or back of a male or female, thus offering an all-in-one multi-purpose device with a wide range of scope in fibrous and polymeric materials moisture management evaluations.

The present invention provides a distribution mode of sweating pores matching the high-intensity sweating pattern on the back of the trunk, simulating regional and profuse sweating zones of the human torso. The realistic assessment of liquid moisture management properties of the clothing fabrics is possible by using 3D realistic torso models and taking into consideration the effects of effective air gaps, body shape and contours on the liquid transmission, accumulation, dripping and evaporation properties of clothing panels under testing. The simultaneous and accurate dynamic assessment is performed in terms of sweat spreading, sweat accumulation, evaporation and dripping from the specimen in contact with the sweating skin under testing. Evaporative cooling potential can be directly measured by monitoring the temperature drop due to evaporation from the fabric under testing in the case of constant power applied. On the other hand, a constant temperature of skin can be regulated, and a maximum mass of liquid evaporation can be measured. The adjustable slope of sweating head allows mimicking the sweating posture and end-user applications in practice. The facile approach of using a multichannel programmable sweating control device can achieve accurate and reproducible sweating rates under repeated testing cycles. Sweating management of fabrics created with continuous or discontinuous water repellent or hydrophilic treatments can be assessed easily. The sweating simulator of the present invention enables a simple construction, results in a light weight and provides user-friendly operations.

It is not possible to test the liquid moisture management properties of the fabric directly on human subjects due to inconsistent skin temperature and sweating rate from various subjects. On the other hand, human-based trials are often much more complicated, expensive, and difficult to organize especially in measuring the liquid sweat management properties of fabrics owing to a large variation in perceived comfort and sweating behavior of subjects. Therefore, the solution provided in the present invention replicates a sweating subject with reproducible skin temperature, sweating rate and testing results.

The scope of widely used existing techniques of moisture management tests is limited to certain kinds of plain, smooth, and low thickness fabrics, whereas a single sweating simulator of the present invention can test a wide range of fabrics, such as warp or weft knitted, woven or nonwoven, smooth or textured, fleece or terry, pinholes or mesh, lofty or thin, lightweight or heavier, coated or laminated, hydrophilic or hydrophobic, partially hydrophobic and partially hydrophilic, single layer or double layers, even crochet or laser-cut patterns, etc.

The sweating simulator of the present invention provides a simultaneous and comprehensive assessment of liquid moisture management properties of fabrics, i.e. fabric wetting behavior, sweat spreading behavior, through-plane and in-plane sweat transmission, gravitational migration, fabric soaking and sticking, as well as sweat accumulation, evaporation, dripping, and drying behaviors of fabrics by mimicking true wearing and environmental conditions, namely body posture, skin temperature and surrounding environmental conditions, by using a single and simple instrument with accurate and reproducible measurements. None of the devices of existing technologies can provide such a comprehensive measurement by a single device as disclosed in the present invention.

The accurate and reproducible measurement of comfort and performance characteristics of fabrics can be implemented by using a single, simple, economical, and user-friendly instrument. Among performance characteristics, the ability of a fabric to absorb, spread, evaporate, drip, retain and dry can be determined concurrently in a single test. Besides, the use of the sweating simulator can be extended to measure the differential absorbency in adjacent layers of fabric with a certain hydrophilicity gradient. Still further, the sweating simulator of the present invention can be employed to separately measure the amount of water dripping from two adjacent layers of fabric with a distinct hydrophilicity gradient and subjected to continuous sweating. Such tests may be employed in constructing double or multilayer ensembles.

Above all, the longevity of moisture management treatments on synthetic fabrics is generally judged by the number of washes the finish applied on fabrics can withstand. Simply stated, the number of washes indicates how many times the moisture management fabric may be worn without compromising its performance. However, there is still a question about how the durability of moisture management finish would be affected between two washes if the garment is subjected to profuse sweating during wearing time. Hence, the sweating simulator of the present invention can be employed to assess the durability of moisture management finishes of synthetic fabric under recurring sweating exposures. Testing this way, the durability assessment of finishing treatments can be made more reliable and realistic.

In contrast to the conventional technologies of measuring liquid moisture management, the sweating simulator of the present invention is multipurpose and advanced in its testing capabilities, thus providing a comprehensive examination of liquid moisture management of textile material and products. The sweating simulator is simple in design, easier in construction, robust, stable, and durable in its formation. The sweating simulator is user friendly in its operation. The sweating simulator is easy in calibration, maintenance, cleaning, assembling, disassembling, installation, and relocation. The sweating simulator can yield accurate and reproducible measurements under controlled environmental conditions, and is more realistic and practical in simulating the true wearing conditions.

Similarly, in an environmental conditioning chamber, the testing of fabrics on the sweating simulator can be made according to practical working, industrial or atmospheric conditions. The sweating simulator of the present invention can boost the research and innovation of developing a new generation of moisture management fabrics and apparel with effective liquid sweat management potential. Moreover, the selection of fabrics for designing and constructing performance clothing, workwear and uniforms can be made more accurate by testing according to the present invention owing to the needs of people showing different sweating intensities under different working conditions. In addition, the process of product development can be made faster and economical, since an early-stage investigation of liquid management properties of newly developed prototypes or commercially available fabrics according to the sweating simulator of the invention can save a lot of effort, material, time, and cost in developing new garments. Instead, developing a whole garment and then testing it on manikins or human subjects could be a lengthier process, which is expensive, complicated, and time-consuming as well.

The sweating simulator of the present invention has obvious advantages in simulating the orientation of body posture, some of the skin attributes as well as adjustable, programmable and reproducible sweating rates along with simulated skin and sweat temperatures. In addition to the skin like characteristics and temperature management, a unique distribution of sweating pores matching the high-intensity sweating zone of the torso is provided by the sweating simulator. Plane surface or a clip-on 3D realistic sweating torso models of chest side or back side of male or female is selected with the provision of adjustable inclination to match the torso posture under observation. The sweating simulator of the present invention provides an adjustable, programmable, reproducible, and precise sweating control solution, along with simple connections methods of sweating components. The present invention has systematic means of specimen positioning and precision in tension adjustment. Another improvement of the present invention lies in the whole-body weighing mimicry of a clothed human subject, and directly measuring the real-time evaporative moisture loss from the fabric under testing. Additionally, the feature of adjustable inclination of sweating head provides an additional advantage in simulating the various body postures and end-user applications.

Data from various fabrics tested on the sweating simulator of the present invention can be fed into software for data collection, processing, analysis and report preparation for storage and further processing.

The sweating simulator of the present invention can be used by, for example, apparel fabric development or use companies, textile industry laboratories and textile research institutions for the development and evaluation of, for example, recreational apparel, sportswear, industrial and construction worker's uniform, for optimization of design, wicking treatment, and construction of evaporative cooling fabrics, or for selection of suitable fabrics for the construction of a certain end user application, and for evaluation of various industrial and technical textiles demanding liquid management properties, evaluation of evaporative cooling pads for convective air-cooling systems, and evaluation of evaporative cooling pads for heat sinks.

DETAILED DESCRIPTION OF THE EMBODIMENTS

Specific embodiments of the present invention will be described in further detail below with reference to the accompanying drawings.

Figure 1:
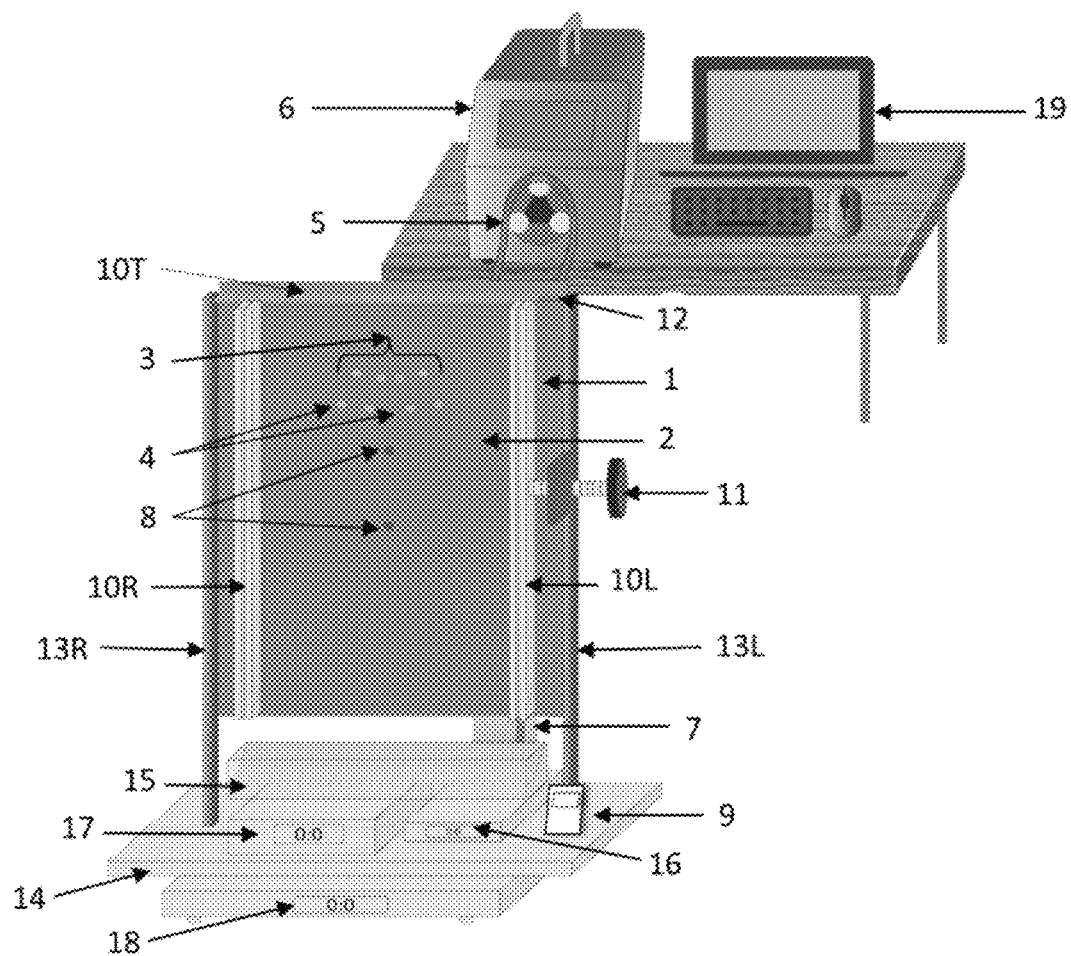
FIG. 1 is a perspective illustration of a novel multipurpose sweating simulator according to the present invention.

FIG. 1 shows an embodiment of a multipurpose version of a proposed novel sweating simulator according to the present invention. In this embodiment, there are typical components required for the operation of the sweating simulator. A panel 1 made of, for example, metal or plastic is mounted on a bar-shaped frame (i.e. first column bar 13R and second column bar 13L), which provides fundamental support to the panel 1 and many components mounted on the panel 1. The panel 1 can be mounted vertically and the inclination/slope of the panel 1 can be adjusted. Typical dimensions of the panel 1 are 500 mm×700 mm×3 mm (width×height×thickness), for example.

The middle area of the panel 1 is further overlaid with a temperature control panel 2 to provide akin to skin wetting characteristics and temperature. The temperature control panel 2 is composed of an elastomer-based fiber reinforced composite in which built-in temperature sensors and integrated heating elements may be provided. A intelligent temperature controller is used to control the temperature of the temperature control panel 2 to be around 33-35° C., to simulate the temperature of human skin. Typical dimensions of the temperature control panel 2 are, for example, about 400 mm×700 mm×2 mm.

The panel 1 and the temperature control panel 2 constitute a sweating plane, and a sweating zone 3 is arranged at an upper-middle position of the sweating plane. The sweating zone 3 may consist of an adequate number of sweating pores 4.

The sweating pores 4 are connected to sweat glands 5 consisting of a plurality of thin flexible conduits, on the back side of the sweating zone 3. The flexible conduit is further threaded through a programmable peristaltic pump 6 and finally bathed in a container 7 containing a so-called sweating fluid (typically distilled water or saline solution). That is, the sweat provided from the container 7 can be sent to the sweating zone 3 through the flexible conduit of the sweat gland 5 by the programmable peristaltic pump 6. Through the control of the peristaltic pump 6, the sweating simulator of the present invention can provide a wide range of sweating rates from about 1 ml/h to 624 ml/h or about 0.004 L/h-m$^2$ to 2.5 L/h-m$^2$ to replicate various sweating intensities in the profuse sweating zone from children, adults or the elderly under certain activities or atmospheric conditions. The sweating simulator of the present invention can simulate various sweating behaviors, such as continuous sweating, discontinuous sweating, constant sweating rate, or increasing or decreasing sweating rate over a set interval of time.

Since sweating occurs typically when the body temperature rises. In practice, the temperature of sweat may be slightly higher than that of skin. To better simulate the temperature difference between the skin and the sweat, the container 7 containing the sweating liquid includes a temperature control device to maintain the temperature of the sweat to be around 35-37° C. In one embodiment, the container 7 including the temperature control device can be, for example, an electric heating water bottle or a water bath equipped with a precise temperature controller.

Besides, a sensor 8 is embedded in the panel 2 through the panel 1 to monitor the real-time temperature of the specimen under testing. In one embodiment, the preferred sensor 8 can be fine thermocouples wire connected to a data logger 9 for recording a real-time temperature variation during sweating and evaporation.

To hold the specimen in position on the temperature control panel 2, three opening and closing clamps (i.e. a first clamp 10R, a second clamp 10L and a third clamp 10T) are attached to the panel 1, adjoining the temperature control panel 2 along its right, left and top edges. In one embodiment, the clamps 10R and 10L are each composed of pair of rectangular metal or plastic bars bolted together at the lower end. Each clamp includes an outer bar and an inner bar to clamp the specimen therebetween at the edges of the temperature control panel 2. The inner bar is free to move in and out around the bolted joint, to open and close the clamp. The clamp 10T may be a one-piece angle bar clamp mounted with hinges to open up and close down at the top edges of panel 1 and temperature control panel 2. In one embodiment, the clamps 10R and 10T are stationary at their positions relative to the panel 1, while the clamp 10L can be displaced right and left by rotating a connecting bolt 11. The displacement of clamp 10L can be used to apply a certain pretension on the specimen under testing. The pretension can help to remove any slackness and creases in the fabric under testing besides obtaining a uniform contact with the underneath sweating skin (i.e. the temperature control panel 2). A scale 12, graduated in millimeters, is fixed on the top right corner of the clamp 10T to directly read the amount of displacement of the clamp 10L.

The panel 1 and all its components are positioned between the two column bars 13R and 13L by using 180-degree steering connecting plates/brackets for slope (inclination) adjustment of the panel 1. The steering connecting plates/brackets are further graduated in degrees to directly measure the slope of the panel 1. The slope of the panel 1 can be adjusted to simulate any active body posture or end-user application under study.

The column bars 13R and 13L are secured at their bottoms to a foundation panel 14, preferably a rigid metal piece (typical dimension: 550 mm×450 mm×3 mm) supported by a robust frame underneath, or may be made of other suitable materials such as plastic or fibre reinforced composites.

During operation, the sweat coming from the sweating zone can be absorbed, transmitted, and evaporated from the fabric. However, in case of continuous sweating, the sweat can also start dripping downward from the bottom edge of the specimen. On the contrary, water droplets can also arrive from beneath the skin if the specimen lacks adequate absorbency. In either case, a container 15 is placed just beneath the bottom edge of the temperature control panel 2 to collect dripping water.

To simultaneously measure the real-time masses of sweat supplied, evaporated, and dripped from the fabric, the sweating simulator device is equipped with three weighing scales, namely a first weighing scale 16, a second weighing scale 17 and a third weighing scale 18. The container 7 used for containing the sweating fluid is positioned on the scale 16 and the container 15 used for collecting the sweat dripping is placed on the scale 17. Both the scales 16 and 17 are installed on the foundation panel 14.

To carry out testing, after the specimen is mounted, the sweating simulator is disposed on a main scale 18 that has a relatively large weighing capacity (e.g., 32-35 kg).

After disposed on the main scale 18, the sweating simulator mimics exactly a standing-up posture of a clothed human subject on the scale 18 in accordance with its measuring principle. The real-time sweat production mass (i.e. reduction in weight of the container 7) is measured with the weighing scale 16, and the real-time dripping mass is measured by the weighing scale 17. Since the change in the reading of the scales 16 and 17 may not cause any change in the reading of the scale 18, the real-time evaporative mass loss is measured by the weighing scale 18.

All the weighing scales and data loggers are connected to a computer 19 for real-time data acquisition into the computer 19, for storage or for further processing. Preferably, the weighing scales 16, 17 and 18 are battery-operated or mains-powered, and data acquisition from the weighing scales and data loggers may be based on wireless communication, or may be transmitted via data lines. The wireless power and data communication strategies allow for faster stability in the readings of the weighing scale 18 when loading with the sweating simulator for testing.

Figure 2:
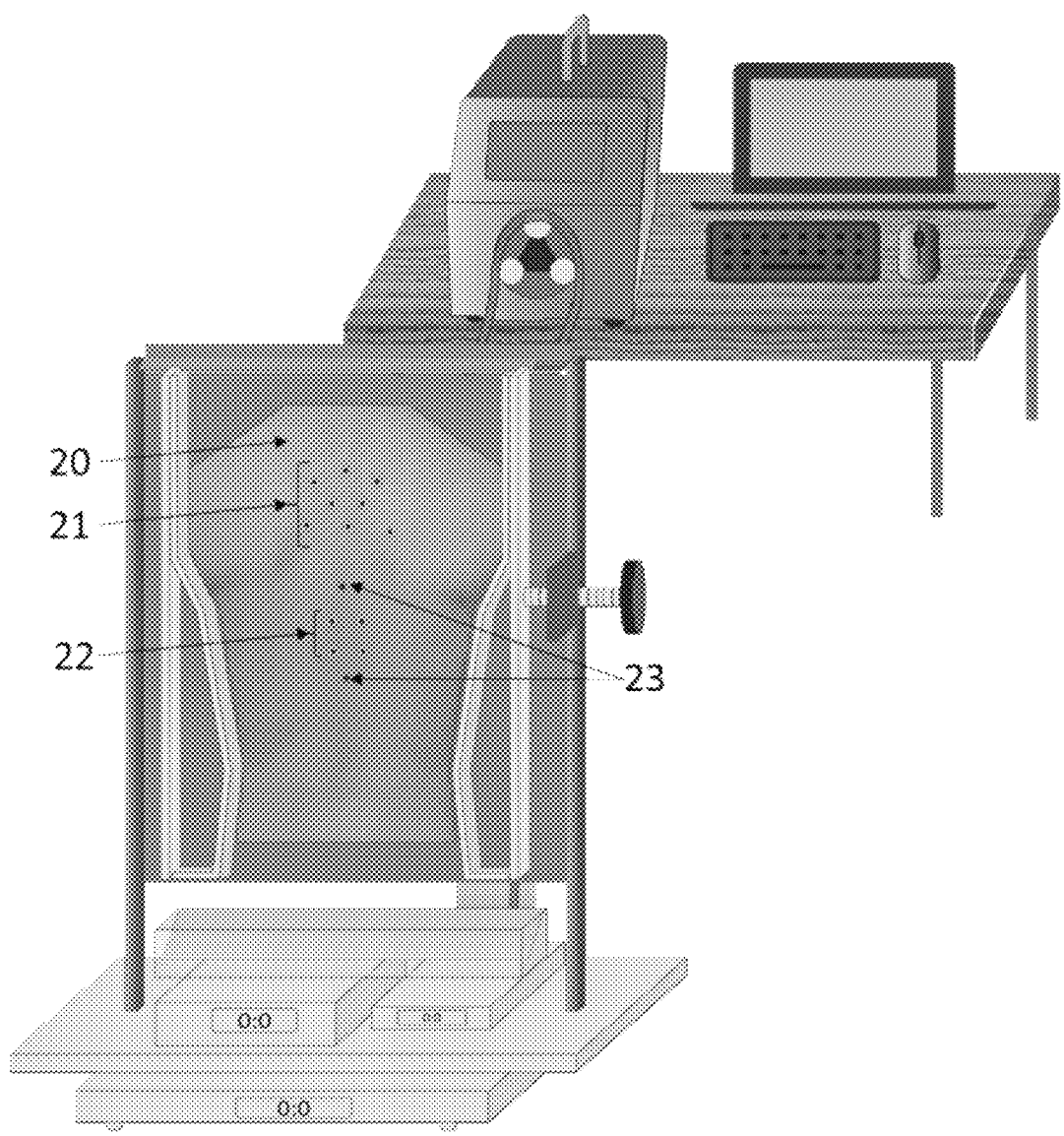
FIG. 2 is a perspective illustration of an advanced version of the novel sweating simulator according to the invention.

FIG. 2 is a perspective illustration of a preferred embodiment of the sweating simulator of the present invention. The sweating simulator can be specifically used to evaluate the liquid moisture management of garment fabrics. The sweat-simulating test specimen (also called a testing head) can include a detachable 3D model for replicating the shape of the back or chest of a male or female torso. In FIG. 2, a testing head 20 is shown as a detachable, 3D-shaped, back-side replica of a male torso rather than the substantially planar shape of FIG. 1. In other embodiments, the torso dummy can be a replica of the chest side or back side of a male or female. The testing head 20 is provided with two sweating zones, i.e. a first sweating zone 21 and a second sweating zone 22, simulating typically high intensity sweating areas on the back of the human torso. For example, the first sweating zone 21 is located at a part corresponding to the middle and upper part of the back of the human body between the shoulder blades, and the second sweating zone 22 is located at the part lower than the first sweating zone and higher than the waist. Additionally, temperature sensors 23 are mounted to monitor the surface temperature of the torso as well as the microclimate formed between the torso and specimen during testing. To replicate skin-like temperature and wetting properties of the dummy 20, preferably the dummy 20 is composed of the same material as that of the temperature control panel 2 shown in FIG. 1.

The sweating pores in the first sweating zone 21 and the second sweating zone 22 may be composed of narrow orifices with an inner diameter in the range of 0.2-0.5 mm. In the embodiment shown in FIG. 2, about 8 and 4 sweating pores are carefully distributed over the sweating zones 21 and 22, respectively, covering an area of about 600 cm$^2$ (upper back) and 200 cm$^2$ (lower middle back), respectively. The number and size of the sweating pores can be adjusted as needed to obtain different sweating rates, so as to conduct different tests on fabric specimens. Sweating rates in the range of about 1 ml/h-624 ml/h or about 0.004 L/h-m$^2$-2.5 L/h-m$^2$ can also be achieved through the sweating pores in zones 21 and 22. Other components shown in FIG. 2 are the same as or similar to those shown in FIG. 1, and are not repeated here.

Figure 3:
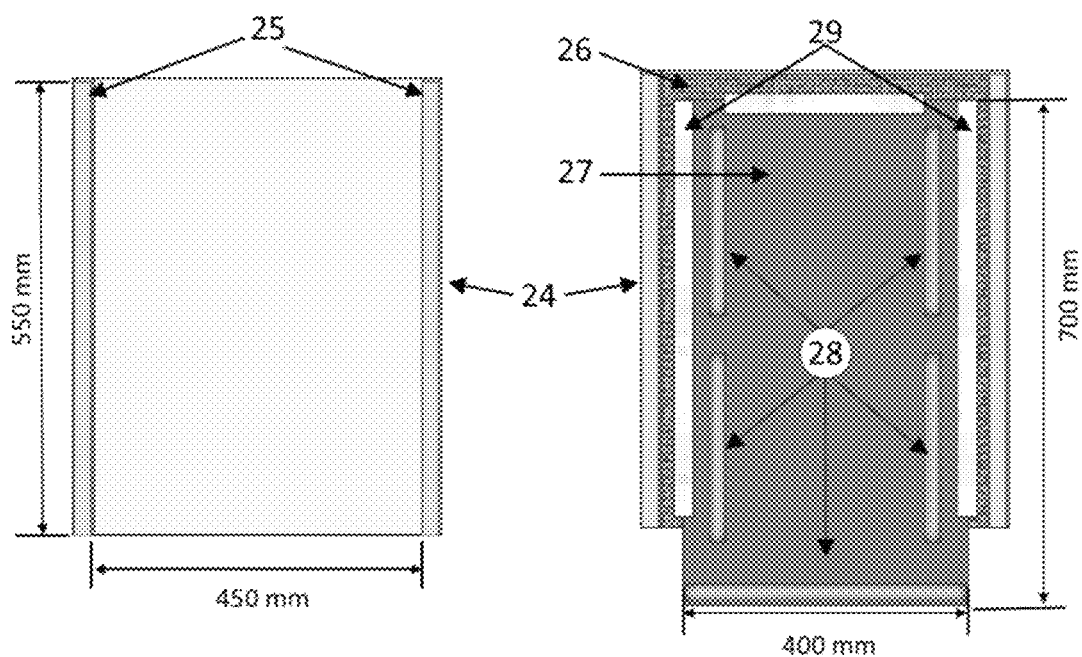
FIG. 3 is a schematic illustration of a device required for appropriate mounting of the specimen on the novel sweating simulator according to the present invention.

Refer to FIG. 3. The device used for specimen preparation and mounting on the sweating simulator of the present invention is shown. Typically, mounting the specimen on the sweating simulator simply by hand is challenging due to the intrinsic flexibility and vertical orientation of the testing head. A two-handed person cannot hold a specimen from its four corners and apply an equal amount of stretch while mounting the specimen on the testing head. Therefore, a systemic approach is developed by the Inventors based on using the mounting device shown in FIG. 3. The mounting device includes a horizontally positioned board 24 (e.g., about 450 mm×550 mm×2.0 mm) with two sidebars 25, and a flexible plastic sheet 27 (about 400 mm×700 mm×0.2 mm) bearing some rubber strips 28 acting as dead weights.

The fabric to be tested is cut into a specimen 26 of standard size (typically 450 mm×550 mm). The specimen 26 is placed flat on the board 24, and lengthwise aligned to the sidebars 25.

The plastic sheet 27 is placed over the specimen 26, about 25 mm below from the upper edge of the specimen. The plastic sheet 27 is further positioned in the middle of the specimen 26 such that the specimen of the same width (about 25 mm) extends on either side of the sheet 27. Strips 29, such as paper tapes, are used to secure the plastic sheet 27. The specimen 26 underneath the plastic sheet 27 extends beyond left, right, and top edges thereof. Afterwards, the plastic sheet 27 is ready to carry the specimen 26 to the sweating simulator for mounting. On the sweating simulator, the distance between the specimen holding clamps (10R and 10L in FIG. 1) is preset to be 400 mm.

The plastic sheet 27, along with the attached specimen on its bottom, is put on the temperature control panel 2 (FIG. 1), being sandwiched between the clamps. The upper corners of the plastic sheet 27 are aligned with the upper ends of the clamps. The portion of fabric extending above the upper edge of the plastic sheet 27 is gripped under the top clamp 10T (shown in FIG. 1). While holding the plastic sheet 27 in place, the specimen is released by removing the strips 29, immediately followed by the opening and closing of clamps to grip the free edges of the specimen.

Once the specimen is secured between the clamps, the plastic sheet panel 27 is removed from the top. The left bar clamp 10L is then displaced towards the right, applying a certain pre-tension to the specimen, governed by the amount of extension applied.

Figure 4:
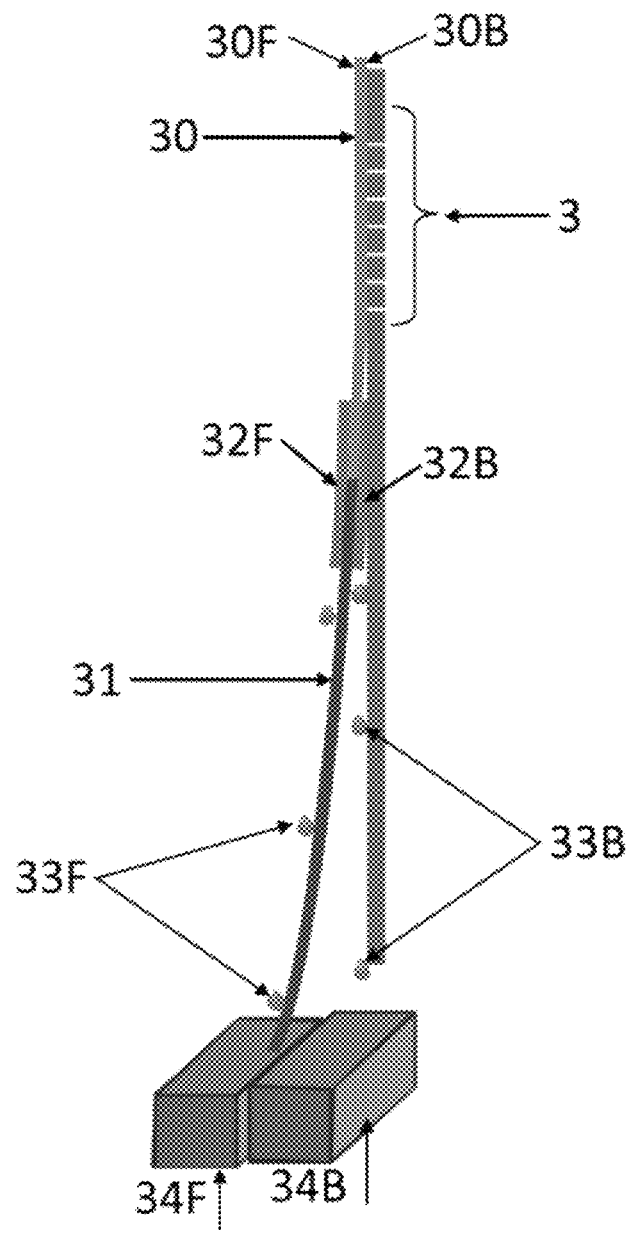
FIG. 4 is a schematic illustration of the method and principle for measuring the liquid directional delivery between two planes of a fabric and the relative distribution of liquid content according to the present invention.

FIG. 4 illustrates the method and principle employed to measure the relative liquid distribution between two planes of the fabric/membrane. A specimen 30 with a face side 30F and a back side 30B is placed above the sweating zone 3 of the sweating simulator (shown in FIG. 1). The bottom edge of the specimen is positioned quite close to the upper edge of a hydrophobic plate 31. The end-to-end connection of the specimen 30 and the hydrophobic plate 31 is sandwiched between a first collection strip 32F of hydrophilic material extending across the face of the specimen and a second collection strip 32B extending across the back of the specimen. In the embodiment shown in FIG. 4, about one-half of each of the first and second collection strips 32F, 32B may overlap above the specimen, while the remaining one-half of each of the first and second collection strips 32F, 32B overlaps with the hydrophobic plate 31 to collect and drain simulated sweat on the face and back of the hydrophobic plate 31 independently.

Sweat applied to the back of a specimen could either migrate along the back or transfer to the face or partially both along the back and face, due to wetting and wicking characteristics of specimen. Nonetheless, on either side, liquid sweat approaching the bottom edge of the specimen is quickly attracted and captured by a respective collector strip of hydrophilic material. The two collector strips act to collect and drain the sweat independently on the face and back of the hydrophobic plate 31, if liquid sweating is continued. Water droplets 33F and 33B dropped from the first collector strip 32F and the second collector strip 32B are collected in two containers 34F and 34B, respectively. When the sweating stops after a certain time, the liquid collected in each container can be measured separately using a weighing balance/scale.

From the amount of drip collected in the two containers 34F and 34B, the following properties of the liquid moisture management fabric can be determined by the following relationships: relative distribution of liquid content through the two planes of the fabric; liquid transported through the face of the fabric (LTF), liquid transported through the back of the fabric (LTB), and the transplane liquid transport capability of the fabric (TLTC), with $$LTF = \frac{A}{A+B} \times 100$$

$$LTB = \frac{B}{A+B} \times 100$$

$$TLTC = \frac{(A-B)}{(A+B)} \times 100$$

where:
A=amount of dripping liquid in the container for the face (g);
B=amount of dripping liquid in the container for the back (g);
LTF=liquid transport through the face of the fabric (%);
LTB=liquid transport through the back of the fabric (%); and
TLTC=transplane liquid transport capacity of the fabric (%).

Therefore, LTF and LTB actually reflect the expected liquid storage capacity of the face and back of the fabric at a given sweat load, respectively. This liquid moisture management test of the present invention is particularly applicable to liquid moisture management fabrics with adequate wetting and wicking properties showing significantly large hydrophilicity gradient between face and back.

While the invention has been described in detail in connection with the limited embodiments, it is to be understood that the invention is not limited to such disclosed embodiments. Those skilled in the art may conceive other embodiments consistent with the spirit and scope of the invention, including changes in the number, alterations, substitutions or equivalent arrangements of parts, which fall within the scope of the invention.

What is claimed is:

1. A sweating simulator comprising a foundation panel (14), a panel (1) mounted on said foundation panel, a temperature control panel (2) supported by said panel, a fixture for fixing a specimen at the temperature control panel (2), a container (7) for holding simulated sweat, a container (15) for collecting the simulated sweat, and a plurality of weighing scales for measuring masses of the simulated sweat supplied, evaporated and dripped from the specimen, respectively, wherein:
said container (15) is positioned under a bottom edge of the temperature control panel (2), said panel (1) and said temperature control panel (2) constitute a simulated sweating plane for simulating wetting properties and temperature of skin, an upper middle position of the temperature control panel (2) comprises a sweating zone (3), said sweating zone (3) comprises a plurality of sweating pores (4), and the temperature control panel (2) comprises a temperature sensor (8) and a heating element.

2. The sweating simulator according to claim 1, wherein the temperature sensor (8) and the heating element are used to control a temperature of the temperature control panel (2) to be around 33-35° C. to simulate a temperature of a surface of the human skin, and a sweating rate of the sweating zone (3) is in a range of about 1 ml/h to 624 ml/h or about 0.004 L/h-m² to 2.5 L/h-m² to respectively simulate various sweating intensities.

3. The sweating simulator according to claim 1, wherein the temperature control panel (2) is composed of an elastomer-based fiber-reinforced composite.

4. The sweating simulator according to claim 1, wherein the sweating zone (3) comprises two sweating zones for respectively simulating a high-intensity sweating zone of a back of a human body, a first sweating zone (21) is located at a part corresponding to a middle and upper part of the back of the human body between shoulder blades, and the second sweating zone (22) is located lower than the first sweating zone and higher than a position of a waist, respectively.

5. The sweating simulator according to claim 4, wherein the first sweating zone (21) comprises about 8 sweating pores and covers an area of about 600 cm², the second sweating zone (22) comprises about 4 sweating pores and covers an area of about 200 cm², and each sweating pore has an inner diameter in a range of about 0.2 to 0.5 mm.

6. The sweating simulator according to claim 1, wherein the sweating simulator comprises first, second and third weighing scales, and wherein the container (7) containing sweat is positioned at the first weighing scale (16), said container (15) is placed on the second weighing scale (17), said sweating simulator is placed on the third weighing scale (18), and the third weighing scale has a greater weighing capacity than the first weighing scale and the second weighing scale, wherein the first weighing scale and the second weighing scale are respectively arranged on the foundation panel (14), and wherein in when measuring, a real-time sweat production loss is measured by the first weighing scale (16), a real-time dripping loss is measured by the second weighing scale (17), a real-time evaporative mass loss is measured by the third weighing scale (18), and a change in a reading of the first weighing scale (16) and the second weighing scale (17) does not cause a change in a reading of the third weighing scale 18.

7. The sweating simulator of claim 6, wherein the first, second and third weighing scales and a data logger for recording the readings of the first, second and third weighing scales are respectively connected to a computer (19) to capture said readings into said computer in real time.

8. The sweating simulator of claim 7, wherein said first and second weighing scales are either battery-powered or line-powered electronic weighing scales, and reading acquisition from said first, second and third weighing scales and the data logger is based on either line or wireless communication.

9. The sweating simulator according to claim 1, wherein the sweating pore (4) is positioned on a back side of the sweating zone (3), and is connected to the container (7) through a simulated sweating gland (5) composed of a plurality of conduits and a peristaltic pump (6).

10. The sweating simulator according to claim 1, wherein simulated sweating liquid formed by distilled water or solution of artificial sweat is housed in the container (7), and the container (7) comprises a temperature control device for maintaining a temperature of the simulated sweating liquid around 35-37° C.

11. The sweating simulator according to claim 10, wherein the container (7) is an electric heating water bottle or a water bath equipped with a precise temperature controller.

12. The sweating simulator according to claim 1, wherein the sensor (8) is embedded into the temperature control panel (2) through the panel (1) for monitoring and/or regulating real-time temperature of the specimen under testing.

13. The sweating simulator according to claim 12, wherein the sensor (8) is a thermocouple wire connected to an intelligent temperature controller, data logger to record real-time changes in temperature.

14. The sweating simulator according to claim 1, wherein the fixture comprises a first clamp (10R), a second clamp (10L) and a third clamp (10T) which can be opened and closed, the first clamp, wherein the second clamp and the third clamp are respectively connected to the panel (1), adjoining the temperature control panel (2) along its right, left and top edges, wherein the first clamp and the second clamp respectively comprise a pair of rods, an inner rod of each of the first clamp and the second clamp can freely move in and out to open and close the clamp, and the third clamp (10T) is hinged to open up and close down at top edges of the panel (1) and the temperature control panel (2), wherein positions of the first clamp and the third clamp on the panel (1) are fixed, and the second clamp (10L) can be displaced left and right by rotating a connecting bolt (11), so as to apply a certain pre-tension on the specimen to be tested such that the specimen to be tested is in uniform contact with the temperature control panel (2) underneath and any slackness and creases in the specimen to be tested are removed.

15. The sweating simulator according to claim 14, wherein the sweating simulator further comprises a bar scale (12) in millimeters, and the bar scale is fixed at an upper right corner of the third clamp (10T) for reading a displacement of the second clamp (10L).

16. The sweating simulator according to claim 14, wherein the foundation panel (14) comprises a rigid part supported by a solid frame, bottoms of a first column bar (13R) and a second column bar (13L) are fixed to the foundation panel (14), the panel (1) and all its components are positioned between the first column bar (13R) and the second column bar (13L), and a 180-degree steering connecting plate is used to adjust a slope of the panel in degrees to simulate any active body posture or end-user application situation being measured.

17. The sweating simulator according to claim 1, wherein a specimen to be tested (30) having a face side (30F) and a back side (30B) is placed on the sweating zone (3), and a first collection strip (32F) of hydrophilic material extends across the face side of the specimen to be tested, a second collection strip (32B) of hydrophilic material extends across the back side of the specimen to be tested, and a bottom edge of the specimen to be tested is close to an upper edge of the hydrophobic plate (31), an end-to-end connection between the specimen to be tested and the panel (1) is sandwiched between the first collection strip (32F) and the second collection strip (32B), about one-half of each of the first collection strip (32F) and the second collection strip (32B) overlap over the specimen to be tested, the remaining one-half of each of the first collection strip (32F) and the second collection strip (32B) overlaps with the hydrophobic plate (31) to independently collect sweat from the face and back of the specimen (30) and drain it on the face and back of the hydrophobic plate (31), water droplets (33F, 33B) dropped from the first collection strip (32F) and the second collection strip (32B) are collected within the two containers (34F, 34B) respectively, and the liquid collected in each container is respectively measured by a weighing scale.

18. The sweating simulator according to claim 17, wherein the following characteristics of the specimen to be tested can be determined according to an amount of dripping in the two containers by the following relationship: relative distribution of liquid content through the two planes of the specimen to be tested; liquid transport through the face of the specimen to be tested (LTF), liquid transport through the back of the specimen to be tested (LTB), and the transplane liquid transport capability of the specimen to be tested (TLTC):

$$LTF = \frac{A}{A+B} \times 100$$

$$LTB = \frac{B}{A+B} \times 100$$

$$TLTC = \frac{(A-B)}{(A+B)} \times 100$$

where:
A=amount of dripping liquid in the container for the face (g);
B=amount of dripping liquid in the container for the back (g);
LTF=liquid transport through the face of the fabric (%);
LTB=liquid transport through the back of the fabric (%); and
TLTC=transplane liquid transport capacity of the fabric (%).

19. The sweating simulator according to claim 1, wherein said fixture comprises a horizontally positioned board (24) with two sidebars (25), and a flexible plastic sheet (27) bearing rubber strips (28), and wherein the specimen to be tested (26) is placed flat on said horizontally positioned board (24) and is aligned with said sidebars (25).

20. The sweating simulator according to claim 1, wherein the sweating simulator simulates various sweating behaviors comprising continuous sweating, discrete sweating, constant sweating rate, or increasing or decreasing sweating rate over a given interval of time, by adjusting the sweating rate of the sweating zone (3).

* * * * *